United States Patent
Mäkipää et al.

(10) Patent No.: US 9,160,470 B2
(45) Date of Patent: Oct. 13, 2015

(54) SYSTEM AND METHOD FOR DELIVERING REPRESENTATIVE MEDIA OBJECTS OF A BROADCAST MEDIA STREAM TO A TERMINAL

(75) Inventors: Mikko Mäkipää, Helsinki (FI); Akseli Anttila, Helsinki (FI); Toni Kopra, Ojakkala (FI)

(73) Assignee: Nokia Technologies Oy, Espoo (FI)

( * ) Notice: Subject to any disclaimer, the term of this patent is extended or adjusted under 35 U.S.C. 154(b) by 1139 days.

(21) Appl. No.: 10/518,168

(22) PCT Filed: Jul. 1, 2002

(86) PCT No.: PCT/IB02/02537
§ 371 (c)(1), (2), (4) Date: Dec. 15, 2004

(87) PCT Pub. No.: WO2004/004177
PCT Pub. Date: Jan. 8, 2004

(65) Prior Publication Data
US 2005/0235324 A1  Oct. 20, 2005

(51) Int. Cl.
*H04N 7/16* (2011.01)
*H04N 7/10* (2006.01)
(Continued)

(52) U.S. Cl.
CPC .......... *H04H 60/80* (2013.01); *H04N 7/17318* (2013.01); *H04N 7/188* (2013.01); *H04N 7/26276* (2013.01); *H04N 7/26468* (2013.01); *H04N 7/26638* (2013.01); *H04N 21/23412* (2013.01); *H04N 21/234318* (2013.01); *H04N 21/2543* (2013.01); *H04N 21/42218* (2013.01); *H04N 21/4331* (2013.01); *H04N 21/44008* (2013.01); *H04N 21/45452* (2013.01); *H04N 21/4627* (2013.01); *H04N 21/4722* (2013.01); *H04N 21/4788* (2013.01); *H04N 21/47205* (2013.01); *H04N 21/8126* (2013.01); *H04N 21/8355* (2013.01); *H04N 21/858* (2013.01);
(Continued)

(58) Field of Classification Search
USPC .................................. 725/32–36, 25–31, 90
See application file for complete search history.

(56) References Cited

U.S. PATENT DOCUMENTS 5,684,799 A * 11/1997 Bigham et al. ................ 370/397
5,760,917 A *  6/1998 Sheridan ....................... 358/442
(Continued)

FOREIGN PATENT DOCUMENTS

| EP | 0 996 245 A2 | 4/2000 |
|---|---|---|
| EP | 1 091 584 A2 | 4/2001 |

(Continued)

OTHER PUBLICATIONS

PCT International Search Report (as published), International Application No. PCT/IB2002/002537, Date of Completion of Search—May 16, 2003.
(Continued)

*Primary Examiner* — Jonathan V Lewis
(74) *Attorney, Agent, or Firm* — Ditthavong & Steiner, P.C.

(57) ABSTRACT

This invention relates to a system and method for delivering a media object associated with a media stream broadcasted from a communication device to a broadcast receiving unit such as a personal computer, a multimedia terminal, a television receiver, a television, or any type of radio receiver, to a terminal such as a phone, a cellular or mobile phone, a personal computer, a television, or a personal office assistant.

26 Claims, 4 Drawing Sheets

(51) Int. Cl.
*H04N 7/025* (2006.01)
*H04N 7/173* (2011.01)
*H04H 60/80* (2008.01)
*H04N 19/20* (2014.01)
*H04N 21/4545* (2011.01)
*H04N 19/17* (2014.01)
*H04N 21/422* (2011.01)
*H04N 21/234* (2011.01)
*H04N 19/63* (2014.01)
*H04N 7/18* (2006.01)
*H04N 21/858* (2011.01)
*H04N 21/2343* (2011.01)
*H04N 21/2543* (2011.01)
*H04N 21/433* (2011.01)
*H04N 21/44* (2011.01)
*H04N 21/4627* (2011.01)
*H04N 21/472* (2011.01)
*H04N 21/4722* (2011.01)
*H04N 21/4788* (2011.01)
*H04N 21/81* (2011.01)
*H04N 21/8355* (2011.01)
*H04N 21/8547* (2011.01)

(52) U.S. Cl.
CPC .... *H04N 21/8547* (2013.01); *H04N 2201/3249* (2013.01)

(56) References Cited

U.S. PATENT DOCUMENTS

| | | | |
|---|---|---|---|
| 5,768,539 A * | 6/1998 | Metz et al. | 709/249 |
| 6,184,878 B1 * | 2/2001 | Alonso et al. | 725/109 |
| 6,292,210 B1 * | 9/2001 | Gerszberg et al. | 348/14.01 |
| 6,298,446 B1 * | 10/2001 | Schreiber et al. | 726/27 |
| 6,317,141 B1 * | 11/2001 | Pavley et al. | 715/732 |
| 6,496,981 B1 * | 12/2002 | Wistendahl et al. | 725/112 |
| 6,785,902 B1 * | 8/2004 | Zigmond et al. | 725/38 |
| 6,928,468 B2 * | 8/2005 | Leermakers | 709/221 |
| 7,343,625 B1 * | 3/2008 | Zaidi et al. | 726/25 |
| 7,493,644 B1 * | 2/2009 | Tanskanen | 725/62 |
| 7,546,378 B2 * | 6/2009 | Gopalakrishnan | 709/236 |
| 2002/0008622 A1 * | 1/2002 | Weston et al. | 340/572.1 |
| 2002/0025777 A1 | 2/2002 | Kawamata et al. | |
| 2002/0059604 A1 * | 5/2002 | Papagan et al. | 725/51 |
| 2002/0069420 A1 * | 6/2002 | Russell et al. | 725/92 |
| 2002/0122042 A1 * | 9/2002 | Bates et al. | 345/581 |
| 2002/0124264 A1 * | 9/2002 | Kikinis | 725/112 |
| 2002/0138828 A1 * | 9/2002 | Robohm et al. | 725/1 |
| 2002/0196364 A1 * | 12/2002 | Hendricks | 348/468 |
| 2003/0028893 A1 * | 2/2003 | H. Addington | 725/115 |
| 2003/0041159 A1 * | 2/2003 | Tinsley et al. | 709/231 |
| 2003/0066074 A1 * | 4/2003 | Zimmerman et al. | 725/14 |
| 2003/0098869 A1 * | 5/2003 | Arnold et al. | 345/589 |
| 2003/0115606 A1 * | 6/2003 | Menez | 725/60 |
| 2003/0135863 A1 * | 7/2003 | Van Der Schaar | 725/95 |
| 2003/0188319 A1 * | 10/2003 | Weissman | 725/106 |
| 2003/0188322 A1 * | 10/2003 | Bontempi | 725/139 |
| 2004/0002359 A1 * | 1/2004 | Deas et al. | 455/556.2 |
| 2005/0177861 A1 * | 8/2005 | Ma et al. | 725/135 |
| 2008/0134255 A1 * | 6/2008 | Ferris et al. | 725/62 |

FOREIGN PATENT DOCUMENTS

| | | |
|---|---|---|
| EP | 1098460 | 5/2001 |
| WO | WO 01/20908 A1 | 3/2001 |
| WO | WO 01/55889 A1 | 8/2001 |
| WO | WO0155889 | 8/2001 |
| WO | WO 02/19701 A1 | 3/2002 |
| WO | WO 02/47391 A1 | 6/2002 |

OTHER PUBLICATIONS

EP Communication dated May 15, 2009—EP Application No. 02743469.5-1224.

* cited by examiner

SYSTEM AND METHOD FOR DELIVERING REPRESENTATIVE MEDIA OBJECTS OF A BROADCAST MEDIA STREAM TO A TERMINAL

FIELD OF INVENTION

This invention relates to a system and method for delivering media objects associated with a broadcasted media stream to one or more terminals.

BACKGROUND OF INVENTION

Media streams such as a radio or television transmissions, videos, or DVDs are generally controlled and presented by a communication system such as a radio or television receiver, a video recorder or DVD player. A user may control the presentation of the media stream by directly operating the communication device so as to select a particular media stream or particular sequence of the particular media stream. The known media streams and known communication devices are satisfactory in the presentation of a media stream in a sequential fashion. However, when it comes to commercial utilisation of the media stream the known communication systems may be further improved in order to serve multi-technical communication systems, i.e. combinations of communication systems, and to fulfil future customer demands for versatility of their communication devices and media stream products.

SUMMARY OF THE INVENTION

An object of the present invention is to provide a system and method for providing media objects of a media stream, which media objects are created for and made available to a user of a communication system during a primary media stream experience.

A further object of the present invention is to capture a frame of a media stream of a broadcast or video transmission to a terminal.

A particular advantage of the present invention is provision of editing capability for editing a frame of a media stream so as to personalise the frame.

A particular feature of the present invention relates to the provision of a "capture of the moment" or "record" hot key in a terminal enabling a user to download a frame from a plurality of frames of a media stream.

The above objects, advantage and feature together with numerous further objects, advantages and features, which will be evident from below detailed description, is accomplished by a solution in accordance to a first aspect of the present invention by a system for delivering a media object to one or more terminals, which media object is associated with a media stream broadcasted to one or more media stream receivers, said system comprising:

a broadcasting network for connecting to said one or more media stream receivers;
a first communications network for connecting to said one or more terminals; and
a communication device connecting to said broadcasting network and broadcasting said media stream to said one or more media stream receivers, and connecting to said communications network and communicating said media object to said one or more terminals.

The term "one or more" should in this context be construed as a, an, at least one, at least a single.

The media stream according to the first aspect of the present invention may comprise a television and/or radio transmitted show, drama, movie, sports game, news, or any combination thereof. Thus any type of television and/or radio transmission may constitute a media stream.

In addition, the media object may comprise a text, a picture, a series of pictures, a video, a series of videos, an audio recording, a series of audio recordings, or any combination thereof. Hence the media object may comprise any related or unrelated information in regards to the media stream and may be presented in any type of readable format.

The terminal according to the first aspect of the present invention may comprise a phone, a cellular or mobile phone, a personal computer, a television, a set top box, a multimedia terminal, a personal office assistant or any combination thereof, and the one or more media stream receivers may comprise a set top box, multimedia terminal, television receiver, television, radio receiver or any combination thereof.

The communication device according to the first aspect of the present invention may broadcast to the one or more media stream receivers by a cable television network, a satellite television network, a radio frequency television network, a telephone network, a powerline network, a radio network or any combination thereof. Thus any type of network may generally be applied for broadcasting of the media stream, i.e. various types of providers capable of transmitting the media stream to the receivers may be used. This provides for a system, which is very versatile.

The communication device according to the first aspect of the present invention may be adapted to transmit digitally coded communication such as digital video broadcasting and/or digital audio broadcasting. The digitally coded signals provide better transmission quality and enables the communication device to forward additional information to a receiver.

The first communications network according to the first aspect of the present invention may comprise a telephone wire network, a cable television network, a powerline network, a computer network, a wireless telephone network, or any combination thereof. The communication between the communication device and the one or more terminals may utilise a wide variety of network types and wide variety of combinations of network types depending upon which provider is selected.

The communication device according to the first aspect of the present invention may comprise a broadcasting unit for broadcasting the media stream to the one or more media stream receivers, a management unit for providing the media object to the one or more terminals, and a second communications network for interconnecting the broadcasting unit and the management unit. The broadcasting unit may comprise a marker for generating a media stream identification tag associated to the media stream, which media stream identification tag may comprise information regarding duration of the media stream, lapsed time of the media stream, broadcasting schedule for the media stream, broadcasting channel for the media steam, or any combination thereof. By tagging the media stream with an identification mark any specific media objects relating to the media stream may be connected to the media stream in the communication device so as to provide a tool for managing the media objects.

Further, the broadcasting unit may be adapted to perform a continuous communication of data regarding the media stream information tag, an updating communication of revision of specific data regarding the media stream information tag, a communication based on schedule of the media stream, or any combination thereof. Any of the above reference communications are advantageous since they all serve a specific purpose. Continuous communication enables the broadcast unit to continuously correct for changes in the broadcast scheduling of the media stream and to continuously create new media objects relating to the media stream. Updating communication similarly provides the broadcasting unit with the possibility to adjust for changes in the broadcast scheduling of the media stream. Finally, the scheduled communication such as predefining intervals in which the broadcast unit may communicate with the management unit provides a well structured and coordinated communication form.

The management unit according to the first aspect of the present invention may comprise an application program interface for receiving the media object, a database for storing the media object and the media stream identification tag, a real time publishing interface for enabling real time publishing of the media object, and a user interface for providing the one or more terminals access to select the media object stored in the database through the first communications network. The various interfaces may be implemented in a plurality of format so as to support a wide range of communication standards.

The user interface may be adapted to respond to a request from the one or more terminals and to generate a media object list of media objects, which are accessible for the one or more terminals.

The second communications network according to the first aspect of the present invention may comprise local area network, metropolitan area network, wide area network, or inter-network such as the Internet, a dedicated communication line, or any combination thereof. The first aspect of the present invention may therefore be implemented for any particular network being wireless or hardwire.

The system according to the first aspect of the present invention may further comprise a billing unit for managing billing transactions for the one or more terminals' requests for the media object and for generating invoices to the one or more terminals in accordance with the billing transactions. The transactions may be recorded so as to present invoices to users of the system.

In addition, the system may further comprise a third communications network for interconnecting the billing unit and the management unit and a fourth communications network for interconnecting the billing unit and the one or more terminals. The third and fourth communications network comprises local area network, metropolitan area network, wide area network, or inter-network such as the Internet, a dedicated communication line, a telephone wire network, a cable television network, a powerline network, a computer network, a wireless telephone network, or any combination thereof. As described above the network type is not limited since the system may be incorporating into any known network types.

The term broadcasting network is to be construed as a cable TV network, a satellite TV network, a radio frequency TV network, a radio cable or terrestrial network, and/or any TV or radio network utilising digital transmission techniques.

The communication device according to first aspect of the present invention may broadcast the media stream and the media object through the broadcasting network and the one or more media stream receivers may connect to the first communications network and communicate the media object to the one or more terminals. The media object may be broadcast through a digital television network as part of the media stream such as through super text TV. A digital receiver such as a set-top box may store the media objects and communicate them subsequently to the one or more terminals.

The above objects, advantages and features together with numerous further objects, advantages and features which will be evident from below detailed description is accomplished by a solution in accordance to a second aspect of the present invention by a method for delivering a media object to one or more terminals, which media object is associated with a media stream broadcasted to one or more media stream receivers, and said method comprising:

(a) associating said media object with said media stream by means of a communication device;
(b) broadcasting said media stream to said one or more media stream receivers through a broadcasting network by means of said communication device; and
(c) communicating said media object to a requesting terminal of said one or more terminals through a communications network by means of said communication device.

The method according to the second aspect of the present invention may further comprise defining a parameter for the media object by means of the communication device and the parameter defining a media object format such as audio, video, image, or any combination thereof, a technical format, an alternative task such as full view or close-up, a terminal requirement, or any combination thereof. By defining the parameter the method provides for an effective means for selecting those media objects which are readable to a specific terminal.

The method according to the second aspect of the present invention may further comprise packaging a set of media objects associated with the media stream and publishing the set of media objects to the one or more terminals by means of the communication device. The packaging may comprise linking the media object to the media stream so that the media object is attached to a broadcasting time line of the media stream and defining the availability of the media object in accordance with the broadcasting time line of the media stream. Obviously, some connection between the media stream and the media objects is required in order to manage a media object relative to a terminal and relative to a media stream.

The packaging may further comprise defining a media object based on a key moment of the media stream as an elapsed time from the start of the media stream, defining the media object's availability prior, during and after broadcast of the media stream, defining an additional time period during which the media object's availability is announced but not available for transfer, or any combination thereof. Any desired part of a media stream may be utilised for the creation of a media object associated with the media stream.

The method according to the second aspect of the present invention may further comprise managing the set of media objects by means of the communication device, and the managing comprises controlling availability of each media object of the set of media objects in accordance with the broadcast time line for the media stream. The availability of the media object is controlled so as to provide a constant high level of current interest in the media objects. This motivates a user to further use the method for downloading more media objects.

The method according to the second aspect of the present invention may further comprise providing the one or more terminals access to the available media objects and enabling a requesting terminal of the one or more terminals to transfer any specific available media object. The providing may comprise presenting a user interface to the one or more terminals, which user interface lists the set of media objects. The user of a terminal may thus select from a set of media objects associated with any particular media stream. The number of media objects in a set may vary in accordance with the popularity of the media stream.

The method according to the second aspect of the present invention may further comprise generating a media object by means of the communication device in response to a request from the one or more terminals. The request is accomplished by a user of a terminal depressing a hotkey for capturing a key moment of the media stream. The user interface presents a specific list for a specific terminal, which specific list comprises a media object, which is readable by the specific terminal. The user of a terminal may thus by depressing a button on his terminal initiate the creation of a media object to a media screen. In this way the user may select any frame or sound he desires from the media stream.

The method according to the second aspect of the present invention may further comprise purchasing the media object from the communication device by means of the one or more terminals, by purchasing the media object the media object is transferred to the one or more terminals. Since media streams may be subject to royalties the user of the method should be at least self supporting or part of a business.

The method according to the second aspect of the present invention may further comprise recording and processing of the transfer of the media object to the one or more terminals by means of a transaction processing device. Payment of the utilised services may be monitored in a wide variety of ways thus the method opens the possibility for implementation in many circumstances.

The method according to the second aspect of the present invention may further comprise identifying the media object format by means of the one or more terminals, the identifying revealing information such as supporting application needed, additional rights pertaining to the media object, forwarding limitations associated with the media object, or any combination thereof.

The method according to the second aspect of the present invention may further comprise providing privileges associated with the media object and with the one or more terminals. The privileges enable the one or more terminals to copy or forward the media object in accordance with each of the one or more terminals' number of purchases of said media object. In addition or alternatively, the may privileges disable the one or more terminals to copy or forward said media object. Further in addition or alternatively, the privileges may disable the one or more terminals to copy or forward more than the one or more terminals' number of purchases. It is important to monitor and restrict the user of the terminals in exploiting the media objects beyond the rights pertained thereto. Hence the method according to the second aspect of the present invention may ensure against this type of exploitation. The privileges may be incorporated in the system according to the first aspect of the present invention.

The method according to the second aspect of the present invention may further incorporate any features of the system according to the first aspect of the present invention.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, wherein.

DETAILED DESCRIPTION OF PREFERRED EMBODIMENTS

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
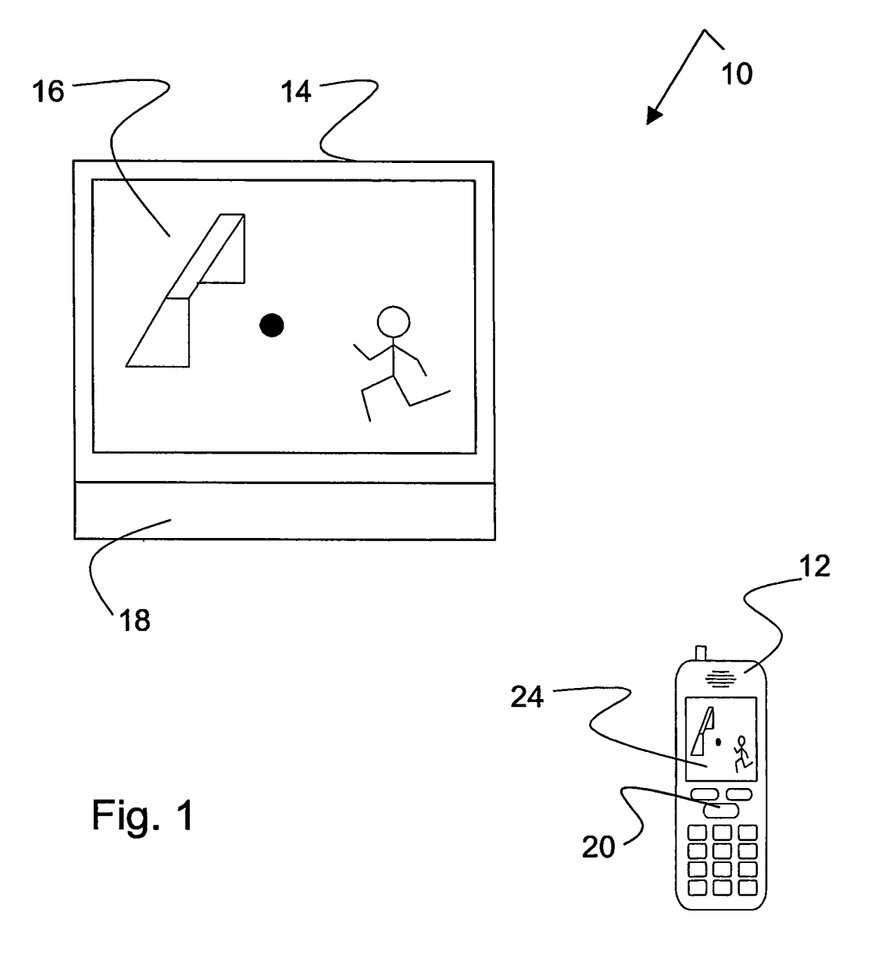
FIG. 1 shows a system according to a first embodiment of the present invention.

A communication system according to a first embodiment of the present invention is shown in FIG. 1 as designated in its entirety by reference numeral 10.

The communication system 10 enables a user of a terminal 12, such as a cell or mobile phone, during a media stream broadcast to capture a media object. A media object should in this context be construed as a frame of a media stream, a series of frames of a media stream, a video sequence of a media stream, a part of a sound track of a media stream, or any combination thereof.

The communication system 10 further comprises a display 14 for displaying a broadcasted media stream 16. The display 14 is communicating with a receiver 18, such as an external or internal digital set-top box, a digital receiver, or an analogue receiver. The receiver 18 may in an alternative embodiment of the present invention further communicate with a video recorder, a DVD player, a radio receiver, a sound amplifier, or any combination thereof.

The media stream 16 is broadcasted through a broadcasting network such as a cable television network, a satellite television network, a terrestrial television network, a telephone network, a powerline network, a cable or terrestrial radio network or any combination thereof.

The terminal 12 may comprise a hot key 20 enabling a user of the terminal 12 to select, by depressing the hot key 20, a media object 24 associated with the media stream 16. Thus, a user of the terminal 12 watching a television show may during the show depress the hot key 20 and thereby request a media object to be transferred through a communications network, such as a wired or wireless telecommunication network. In addition, the user of the terminal 12 may select any part of the media stream 16 such as any particular audio tracks from the media stream 16.

The communication system 10 enables turning existing mass media properties into further digital merchandise by utilising the familiarity and appeal of characters, events and themes songs of particular television shows, movies or radio programs for media objects to be incorporated into a user's terminal 12.

The media object 24 is created as a representation of a particular scene of a television show, however, the media object 24 may be any key moments of television shows, movies or radio programs such as high points of the plot line (Ross and Rachel's first kiss in the television series "friends"), a clever punch line in a television show, a particular comment by a character in a movie or television show, a goal scored in any sports game. The media object 24 may be a video clip, a picture, a series of pictures, animations, soundtracks or the like.

The media object 24 when transferred onto the terminal 12 may be used as any personal terminal enhancement such as background images, ringing tones, messages, or logos. The terminal 12 comprises an editor for enabling a user of the terminal 12 to edit the media object 24 in accordance with any personal preferences. The terminal 12 further comprises a memory for storing of the media object 24 so that the user may further communicate the media object 24 per se or an edited version of the media object 24 to other terminals through a wireless telecommunications network and/or utilising a multimedia messaging service.

Figure 2:
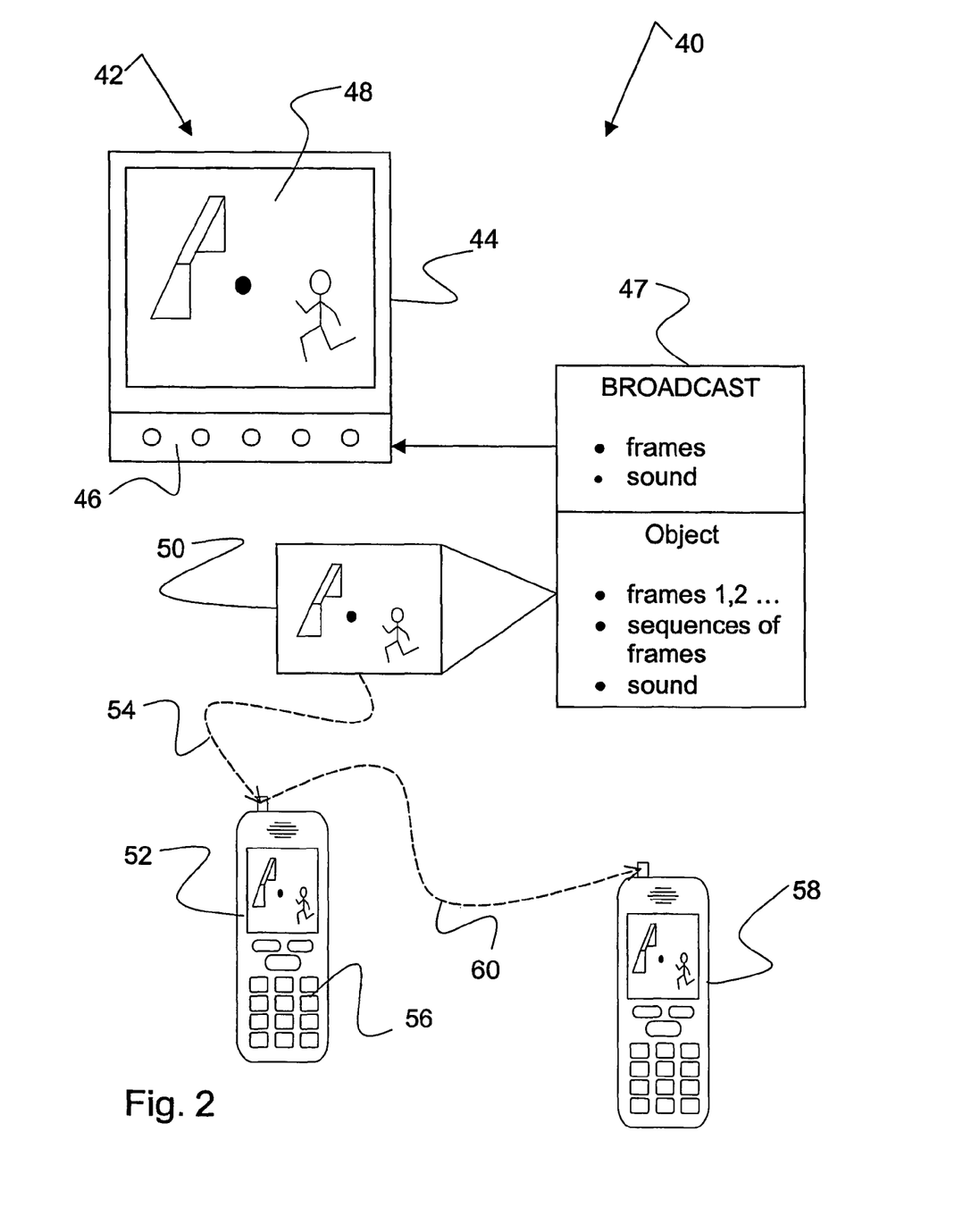
FIG. 2 shows an example of the methodology used by the system according to the first embodiment of the present invention.

An example of the methodology is shown in FIG. 2. A communication system designated in its entirety by reference numeral 40 comprises a television set 42 having a monitor 44 and a receiver 46 and displaying a specific media stream 48, and comprises a communication device 47 for broadcasting the specific media stream to the receiver 46 and for providing media objects related to the specific media stream to any number of terminals.

A first user is watching the media stream 48 on the television set 42 and desires to transfer a media object 50 associated with the media stream 48 onto a first terminal 52, which transfer is shown as an arrow 54. The first user captures this media object 50 by using the first terminal 52 and pressing the "capture the moment" hot key 56. The first user may then want to share the media object 50 with a second user of a second terminal 58 and hence in accordance with a set of privileges associated with the first user communicate the media object 50 by utilising for example a multimedia messaging service (MMS), which communication is shown in FIG. 2 as an arrow 60. The second user of the second terminal 58 may subsequently be using the media object for example as a personal background on his/her terminal or in accordance with a set of privileges associated with the second user distribute it further by sending for example a new e-mail with the media object attached with the e-mail transmission.

The utilisation of the multimedia messaging service for forwarding or sharing the media object may be incorporated in the terminal as a application program presenting a menu enabling the user to activate a transfer of the media object. In addition, the application program may open a recipient window to be filled by the user of the terminal prior to activating a transfer of the media object and in this process offering the user the use of the address book of the terminal. Further, the application program may comprise a editing facility enabling the user of the terminal to edit in the media object prior to activating the transfer of the media object. The editing facility the user may add comments to the media objects. Furthermore, the application program may enable the introduction of an advertisement to be associated and forwarded with the media object. This renders it possible to have messages partly of fully financed by the advertiser who wants to sponsor the media object.

Both the first and second terminal 52 and 58 provide the first and second user with the possibility to edit the media object 50 so as to personalize a message in conjunction with the transmission of the media object from one terminal to the next.

Figure 3:
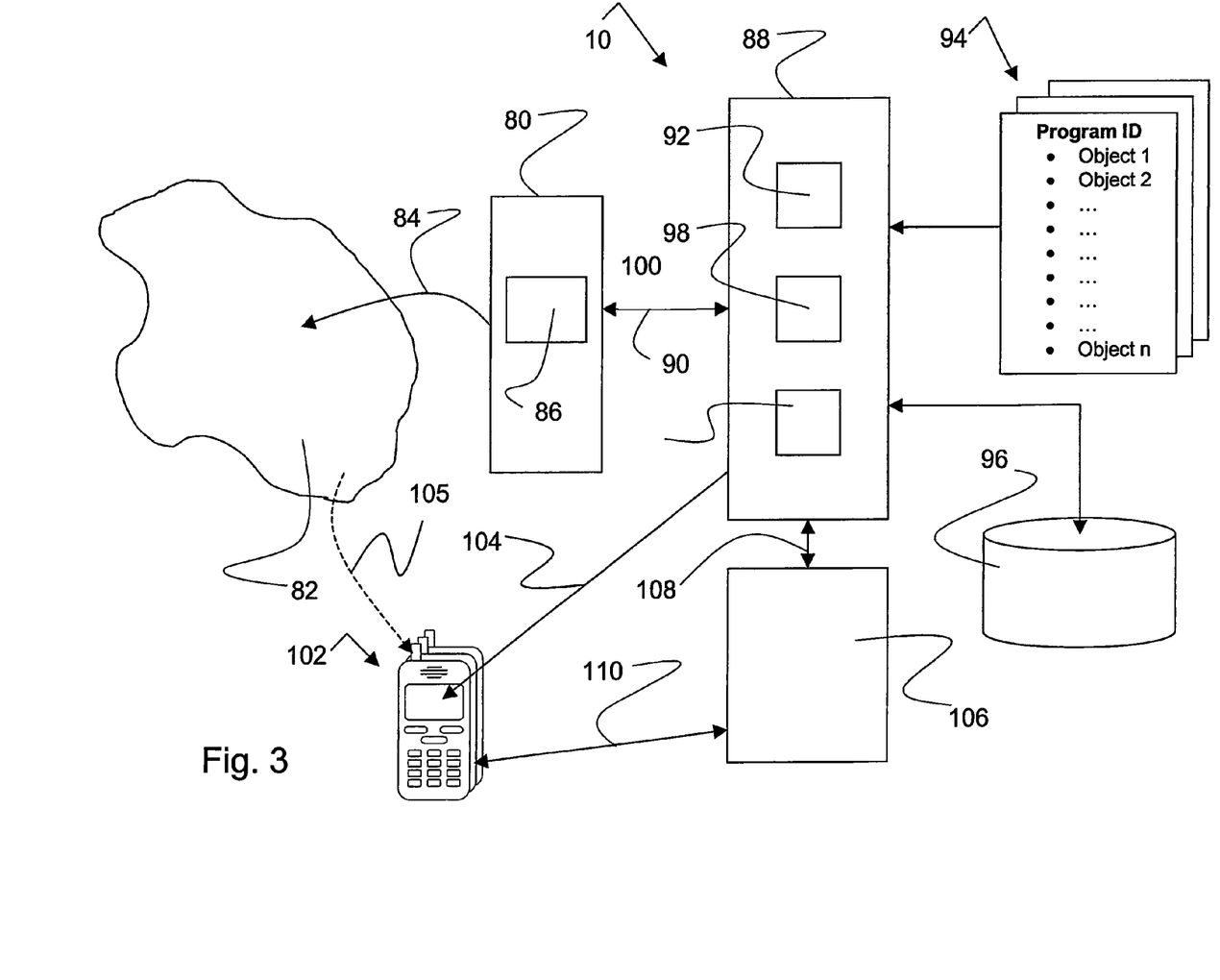
FIG. 3 shows an overall view of key components of the system according to the first embodiment of the present invention.

FIG. 3 shows an overall view of the key components of the communication system 10. The communication system 10 comprises a broadcast unit 80 for broadcasting a media stream to one or more television receivers in any given region 82. The broadcast of the media stream is shown as a first arrow 84 and may be accomplished by wireless, cable or satellite transmission. The region 82 may be defined by a cable television network or a plurality of individual television receivers.

The broadcast unit 80 comprises a marker 86 for continuously generating an associated media stream identification tag to a specific media stream to be aired on a specific transmission date and time. The tag may contain further information regarding duration of the specific media stream, lapsed time of the specific media stream and transmission channel.

The broadcast unit 80 communicates the associated media stream identification tag to a management unit 88 through a first communications network 90 such as local area network, metropolitan area network, wide area network, or inter-network such as the Internet, or alternatively on a dedicated line. The management unit 88 comprises an application program interface 92 for receiving one or more media objects 94 associated with specific media stream identification tags and connects to a database 96 for storing the one or more media objects 94 together with the associated media stream identification tag.

The broadcast unit 80 may perform a continuous transmission of data regarding a media stream information tag, an updating transmission of revision of specific data regarding a media stream information tag, or a transmission based on a scheduled program listing.

Furthermore, the management unit 88 comprises a real time publishing interface 98 enabling real time publishing of media objects. That is, enabling publishing of the one or more media objects 94 during the broadcast unit's broadcast of an associated media stream.

In addition, the management unit 88 comprises an interface processor 100 for providing one or more terminals 102 access to the one or more media objects 94 stored in the database 96 through a wireless communications network 104. The interface processor 100 responds to a call from one or more of the terminals 102 and generates a media object list of the one or more media objects that are accessible for the specific one or more terminals 102 at that specific date and time. The access of the one or more media objects 94 may thus be limited to a specific time period so as to create media objects which are dependent on the transmission of a media stream.

The management unit 88 further communicates with a billing device 106 through a second communications network 108, which may be any of the above types mentioned with reference to the first communications network 90, it may in fact be the same communications network. The billing device 106 manages transactions of media objects, accounts of the one or more terminals 102, and generates invoices. The billing device 106 may further communicate with the one or more terminals 102 through a third communications network 110, which as before may be any of the above types mentioned with reference to the first and second communications network 90 and 108 in combination with a wireless communications network.

In an alternative embodiment of the management unit 88 communicates the media objects through the second communication network 90 to the broadcast unit 80, which communicates the media objects to the one or more television receivers or set-top box in the region 82 together with the media stream. The media objects may be communicated as a super text TV object. The one or more television receivers communicate the media objects to the terminals through a wireless communications network 105.

Figure 4:
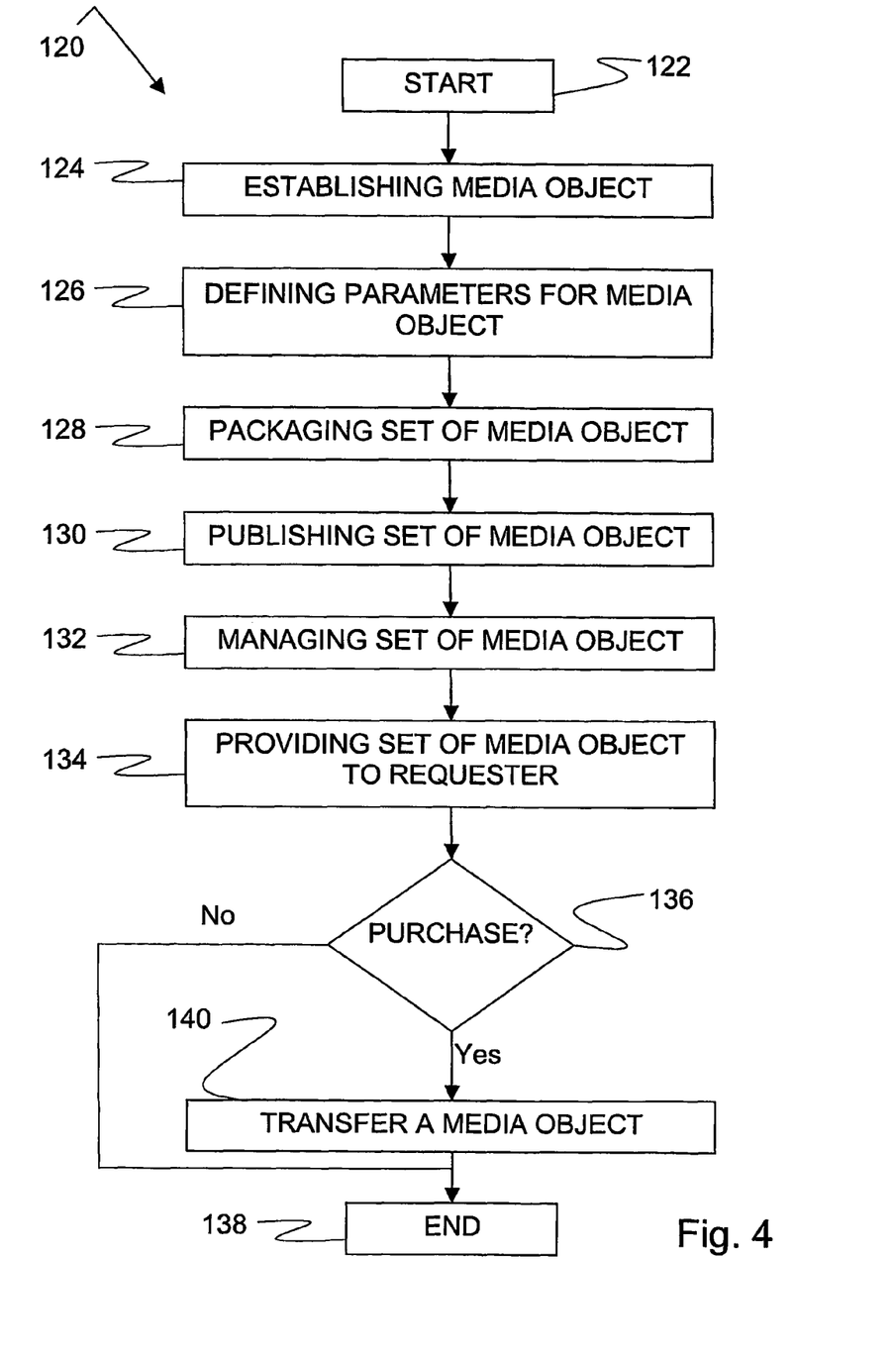
FIG. 4 shows a flow chart of method according to a second embodiment of the present invention.

FIG. 4 shows a flow chart of a method according to a second embodiment of the present invention, which method is designated in its entirety by reference numeral 120. The method 120 comprises a start 122 for performing initialisation of the method 120. The start 122 involves establishing an interface for media object generating devices, such as the broadcast unit 80 described with reference to FIG. 3, and an interface for a terminal, such as the one or more terminals 102 described with reference to FIG. 3.

The media object generating devices utilise a management unit, such as described with reference to FIG. 3 as the management unit 88, for establishing media objects 124 on or under the control of the management unit. The media object generating devices use an original media stream content for creating the media objects associated with said original media stream. The media objects may be key frames or key sounds, which define a special moment of the media stream. The media objects are created prior to broadcasting the media stream, which broadcasting may be performed one or more times in one or more regions or in one ore more television network. However, the media objects may, in addition, be created during a broadcast of an associated media stream, for example during live sports broadcasts, which enable a terminal to select representative frames of the media stream (sports broadcast) such as a goal scored during a soccer match.

The media objects may be implemented in any format such as in Synchronized Multimedia Integration Language (SMIL) format, any JPEG format, any Graphics Interchange Format (GIF), audio or digital audio formats, Audio IFF, Computer Graphics Metafile, TIFF, BIFF, bmp, Clear, FITS, NFF, OFF, PCX, PNG, TGA, XBM, mod, any Moving Picture Experts Group (MPEG) format, Musical Instrument Digital Interface, PICT, PNG, Portable Document Format (PDF), Portable Network Graphics, Portable Pixmap, progressive coding, Quicktime, RIFF, Self Extracting Archive, sequential coding; server-parsed HTML, sprite, Tagged Image File Format, targa, Targa Graphics Adaptor, thumbnail, wav, WebCGM, wireless bitmap, xpm or a different frame rate video.

In an alternative embodiment of the present invention the media objects are created automatically or semi-automatically.

Defining the parameters 126 is achieved by the management unit. The parameters of the media objects may define media object type (audio, video or image), technical format (as described above e.g. JPEG), alternative tasks (full view, close-up), terminal requirements (e.g. Nokia 6100 series). In addition, textual matter or preview versions may be included in the media objects.

When the management unit has received all necessary information regarding media objects associated with a specific media stream the management unit packages the media objects as a set of media objects during packaging 128. The packaging 128 comprises associating the media objects to a specific media stream so that each media object are attached to the time line of the media stream by defining the availability of the media object in accordance with the time line of the media stream. This may be achieved by defining the key moment as elapsed time for the start of the media stream (e.g. media stream title, media object identification tag, and media object title—second goal), defining the media object's availability prior, during and after broadcast of the media stream, as well as defining an additional time period during which the availability of a media object is announced but not available for transfer (e.g. advertised prior to broadcast).

When the packaging 128 is accomplished the management unit initiates a publishing 130 of the media object or the set of media objects so that the media object or set of media objects are associated with the specific media stream.

During the media stream broadcast the management unit controls the availability of the media object or the set of media objects by managing 132 availability in accordance with the pre-defined timing and the progression of the media stream broadcast, while taking in to account delays in the start of the broadcast and commercial breaks.

In conjunction with controlling availability of the media object or set of media objects the management unit enables one or more terminals to access the available media objects by providing 134 the requesting one or more terminals to transfer any particular available media object.

The providing step 134 further comprises presenting a user interface to the one or more terminals, which user interface lists the set of media objects, which may be generated by the managing device as a response to a request from the one or more terminals such as accomplished by a user of a terminal depressing a hotkey for capturing a media stream moment, as described with reference to FIG. 3. By depressing the hotkey the user navigates to a web page or starts a particular application. The user interface presents a specific list for a specific terminal, which specific list comprises media objects, which are readable by said specific terminal. Hence the user interface is dynamic in relation to the one or more terminals. For example, if the management unit knows that the specific terminal only supports PNG images the user interface does not present available GIF images.

Furthermore, the list may comprise presently unavailable media objects that will be available in the future and/or previously available media objects, which presently are unavailable. Alternatively, if only one media object is available at any time the user interface may direct the user to directly transfer the media object omitting listing alternatives.

The user/users of the one or more terminals are subsequently asked whether a purchase of a media object is requested during a purchase? step 136. The media object may have a price, which subsequently to the user transferring the media object is charged to the user. If the user does not wish to purchase a media object, the method 120 is terminated in termination step 138.

On the other hand if the user wishes to purchase a media object of the list of media objects the method 120 moves to transfer the chosen media object during a transfer step 140. When the chosen media object is transferred to the user the transaction is recorded and processed by a separate transaction processing device such as the billing device as described with reference to FIG. 3. The transaction may be accomplished in a wide variety of ways such as micro-payment, charging against user account or operating billing.

When the media object is transferred to the user's terminal it may be identified by the terminal by its format or supporting application (e.g. through MIME type mapping). This initial identification may further reveal which type of potential use is allowed. That is, additional rights and limitations may be attached to the media object (e.g. the user's ability to forward the media object to others may be limited). Hence, when a specific user of a terminal purchases a certain media object, which is transferred to the terminal, the media object includes privileges describing rights and limitations in use or copying of the media object.

The invention claimed is:

1. An apparatus comprising:
   at least one processor; and
   at least one memory including computer program code,
   the at least one memory and the computer program code configured to, with the at least one processor, cause the apparatus to perform at least the following,
   receive a request for a media object, after the media object requested being broadcast in a media stream through a first communications network to one or more wireless communication terminals, rendered at one or more of the wireless communication terminals, and then tagged via no more than one hotkey press made at the one or more of the wireless communication terminals while the media object is being rendered, wherein tagging of the media object and transmitting of the request from the one or more of the wireless communication terminals are triggered by the hotkey press, and the media object is a frame of the media stream, a series of frames of the media stream, or a part of a sound track of the media stream; and in response to the request, determine to transmit the tagged media object to the one or more wireless communication terminals through a second communications network independent from the media stream.

2. An apparatus according to claim 1, wherein the first communications network is a broadcast network, and the second communications network is a wired or wireless communications network.

3. An apparatus according to claim 1, wherein the apparatus is a user terminal or a broadcasting unit.

4. An apparatus according to claim 1, wherein the user selection is entered via a hotkey at the one or more of the wireless communication terminals to tag the media object.

5. A method comprising:
receiving at an apparatus a request for a media object, after the media object requested being broadcast in a media stream through a first communications network to one or more wireless communication terminals, rendered at one or more of the wireless communication terminals, and then tagged via no more than one hotkey press made at the one or more of the wireless communication terminals while the media object is being rendered, wherein tagging of the media object and transmitting of the request from the one or more of the wireless communication terminals are triggered by the hotkey press, and the media object is a frame of the media stream, a series of frames of the media stream, or a part of a sound track of the media stream; and in response to the request, determining to transmit the tagged media object from the apparatus to the one or more wireless communication terminals through a second communications network independent from the media stream.

6. A method according to claim 5, further comprises defining a parameter for said media object, said parameter defining a media object format as audio, video, image, or any combination thereof, a technical format, an alternative task of full view or close-up, a terminal requirement, or a combination thereof.

7. A method according to claim 5, further comprises packaging a set of media objects associated with said media stream and publishing said set of media objects to said one or more wireless communication terminals.

8. A method according to claim 7, wherein said packaging comprises linking said media object to said media stream so that said media object is attached to a broadcasting time line of said media stream and defining the availability of said media object in accordance with said broadcasting time line of said media stream.

9. A method according to claim 7, wherein said packaging further comprises defining a media object based on a key moment of said media stream as an elapsed time from the start of the media stream, defining the media object's availability prior, during and after broadcast of said media stream, defining an additional time period during which said media object's availability is announced but not available for transfer, or any combination thereof.

10. A method according to claim 5, further comprises identifying said media object format, and identifying information such as a supporting application, one or more privileges pertaining to copy or edit or forward said media object, forwarding limitation associated with said media object, or a combination thereof.

11. A method according to claim 5, wherein the first communications network is a broadcast network, and the second communications network is a wired or wireless communications network, and
in response to the request, no more than the tagged media object is transmitted from the apparatus to the one or more wireless communication terminals through the second communications network.

12. A method according to claim 5, wherein the apparatus is a user terminal or a broadcasting unit.

13. A method according to claim 5, further comprising controlling the availability of the media object in accordance with pre-defined timing.

14. A method according to claim 5, wherein the hotkey press is made on a button physically configured on the one or more of the wireless communication terminals to tag the media object and transmit the request.

15. A method according to claim 5, further comprising:
causing, at least in part, rendering of the requested media object at the wireless communication terminal in a manner identical with the media object in the media stream rendered at the wireless communication terminal.

16. A method comprising:
rendering a media stream received through a first communications network at an apparatus;
tagging a media object in the media stream and determining to transmit a request for the tagged media object through a second communications network based upon no more than one hotkey press made at the apparatus when the media stream being broadcast and the media object being rendered at the apparatus, wherein the media object is a frame of the media stream, a series of frames of the media stream, or a part of a sound track of the media stream;
in response to the request, receiving the requested media object through the second communications network independent from the media stream.

17. A method according to claim 16, wherein the first communications network is a broadcast network, and the second communications network is a wired or wireless communications network, and
in response to the request, no more than the tagged media object is received at the apparatus through the second communications network.

18. A method according to claim 16, wherein the apparatus is a wireless communication terminal.

19. A method according to claim 18, further comprising using privileges associated with the requested media object, wherein the privileges includes a privilege that enables the wireless communication terminal to copy or edit or forward the requested media object in accordance with a number of purchases of the requested media object, a privilege that disables the wireless communication terminal to copy or edit or forward the requested media object, a privilege that disables the wireless communication terminal to copy or edit or forward more than a number of purchases of the requested media object, or a combination thereof.

20. A method according to claim 19, further comprising:
causing, at least in part, editing of the requested media object with one or more advertisements at the wireless communication terminal based, at least in part, on the privileges;
causing, at least in part, transmission of the edited media object from the wireless communication terminal to one or more other wireless communication terminals based, at least in part, on the privileges; and
receiving one or more rewards from one or more sponsors of the one or more advertisements based, at least in part, on the transmission of the edited media object.

21. A method according to claim 16, wherein the hotkey press is made on a button physically configured on the one or more of the wireless communication terminals to tag the media object and transmit the request.

22. A method according to claim 16, further comprises identifying the media object format; and identifying information includes a supporting application, right pertaining to the media object, forwarding limitation associated with the media object, or a combination thereof.

23. An apparatus comprising:
at least one processor; and
at least one memory including computer program code,
the at least one memory and the computer program code configured to, with the at least one processor, cause the apparatus to perform at least the following,
render a media stream received through a first communications network;
tag a media object in the media stream and determine to transmit a request for the tagged media object through a second communications network based upon no more than one hotkey press made at the apparatus when the media stream being broadcast and the media object being rendered at the apparatus, wherein the media object is a frame of the media stream, a series of frames of the media stream, or a part of a sound track of the media stream;
in response to the request, receive the requested media object through the second communications network independent from the media stream.

24. An apparatus according to claim 23, wherein the first communications network is a broadcast network, and the second communications network is a wired or wireless communications network.

25. An apparatus according to claim 23, wherein the apparatus is a wireless communication terminal.

26. An apparatus according to claim 23, wherein the user selection is entered via a hotkey at the apparatus to tag the media object.

* * * * *